Aug. 18, 1970  MASAKI ISSHIKI ET AL  3,524,697

ACHROMATIC SUPER WIDE-ANGLE LENS

Filed April 23, 1968  2 Sheets-Sheet 1

United States Patent Office 3,524,697
Patented Aug. 18, 1970

3,524,697
ACHROMATIC SUPER WIDE-ANGLE LENS
Masaki Isshiki and Keiji Matsuki, Tokyo, Japan, assignors to Nippon Kogaku K.K., Tokyo, Japan, a corporation of Japan
Filed Apr. 23, 1968, Ser. No. 723,364
Claims priority, application Japan, Apr. 27, 1967, 42/26,623
Int. Cl. G02b 5/22, 9/60
U.S. Cl. 350—196          4 Claims

ABSTRACT OF THE DISCLOSURE

An achromatic super wide-angle lens is provided comprising at least two meniscus lenses extremely curved towards the front, a stop, a doublet or triplet arranged between said meniscus lenses and the stop, an another doublet and other lenses arranged behind the stop, and a filter and the inventive lens satisfies the specific conditions so that the angle of view of 220° to 270° can be obtained and the chromatic aberration and other aberrations are well corrected and the lens has a lightness of about F/5.6.

---

The present invention relates to an achromatic super wide-angle lens.

It has been proposed such an achromatic fish-eye lens having the angle of view of about 180° as disclosed in Japanese Pat. No. 438,664 specification owned by the present assignee.

The present invention provides an achromatic super wide-angle lens which is light as much as F/5.6 and having angle of view ranging from about 220° to 270° and chromatic aberration and other aberrations are excellently corrected.

In a super wide-angle lens having an angle of view above 180°, it has been very difficult to correct chromatic aberration and image curving and when the angle of view becomes about 220° the aberration generated in the strong negative lens provided on the front portion is remarkably great, and particularly the correction of chromatic aberration is very difficult.

In accordance with this invention, such drawbacks can be removed, and achromatic super wide-angle capable of color photography is obtained, and in addition to that, in accordance with this invention, the astigmatism of the peripheral angle of view whose correction has been insufficient before, is excellently corrected and when the lens of this invention is used for 35 mm. camera lens which requires large magnification in enlarging the photographic printing, sufficiently clear image can be obtained.

The present invention provides an achromatic super wide-angle lens comprising two or three meniscus lenses extremely curved toward the front, a stop, a doublet or triplet arranged between said meniscus lenses and the stop, an another doublet and other lens groups provided behind the stop, and a filter provided before the stop and the present lens satisfies the specific conditions defined in to following.

Figure 1:
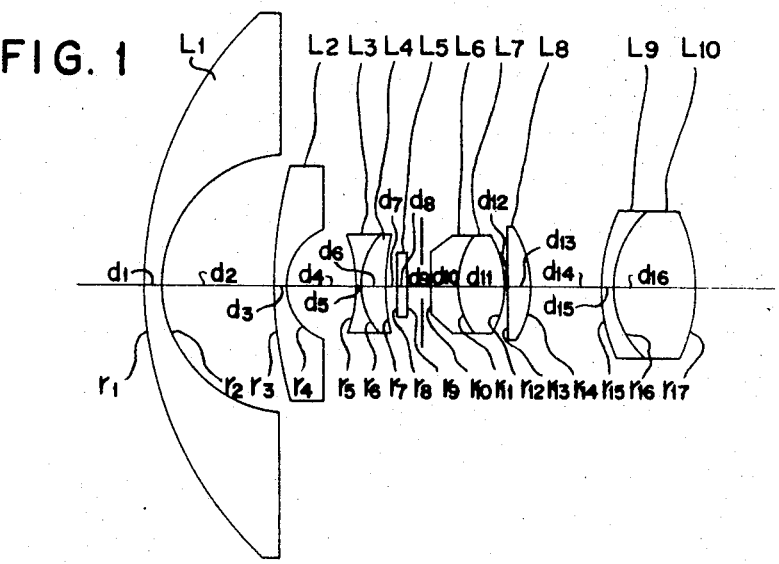
Figure 2:
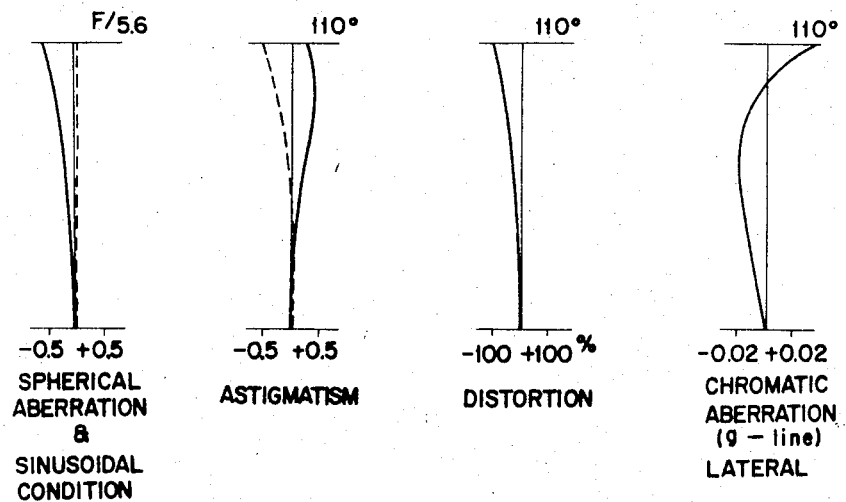
Figure 3:
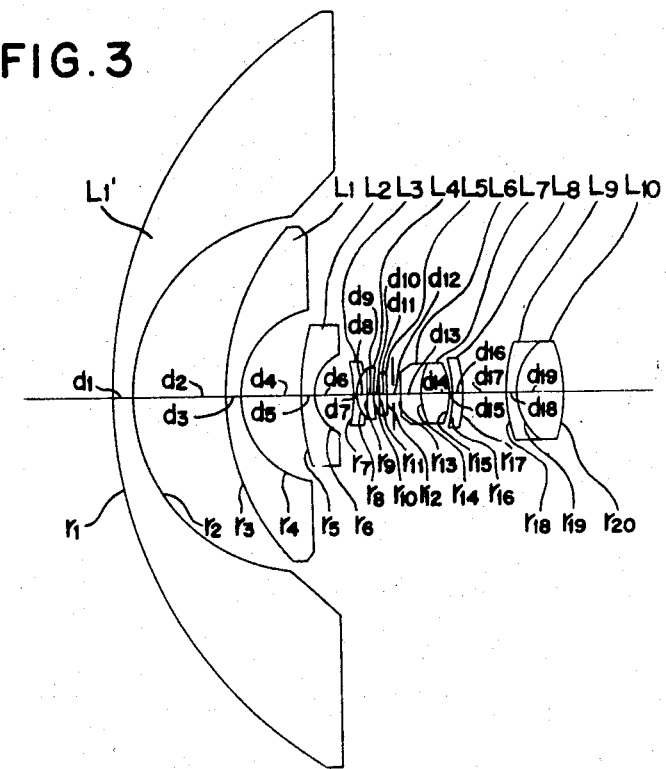
Figure 4:
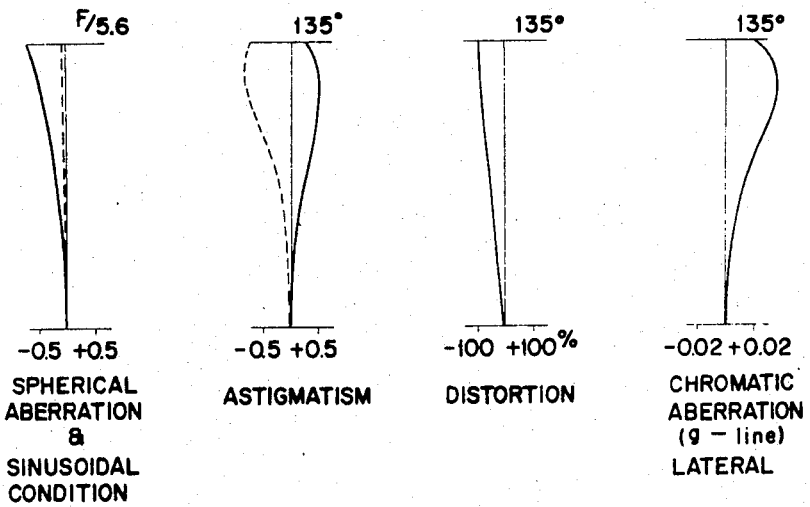

The present invention will be described more in detail which reference to illustrative embodiments shown in the attached drawing, in which:

FIG. 1 shows the arrangement of an embodiment of achromatic super wide-angle lens of this invention;
FIG. 2 is a diagram showing the aberration thereof;
FIG. 3 shows the arrangement of another embodiment of this invention; and
FIG. 4 is a diagram showing the aberration of the embodiment shown in FIG. 3.

In accordance with this invention, as is shown in FIG. 1 two convex meniscus lenses $L_1$ and $L_2$ curved extremely towards the front (to the left) are provided; and between said meniscus lenses and the stop doublet $L_3$ and $L_4$ and $L_4'$, and behind the stop (to the right) the doublet $L_6$, $L_7$ and lenses $L_8$, $L_9$ and $L_{10}$ are provided, and $L_5$ is an optional filter, and the following five conditions are satisfied.

(1) For meniscus lenses $L_1$ and $L_2$, a glass having a refractive index above 1.57, and Abbe's number above 54 is used.

(2) Among the doublets $L_3$, $L_4$ in front of the stop, the glass of the positive lens $L_4$ should have Abbe's number below 40, and when the focal length is made to be $f+$, the condition $f+ < 5f$ should be satisfied, and the glass of the negative lens $L_3$ should have Abbe's number above 50, and the focal length thereof $f-$ is within the range of $|f-| < 5f$.

(3) The glass of the negative lens in the doublet $L_5$, $L_7$ behind the stop should have Abbe's number below 35, and the glass of the positive lens should have Abe's numer above 35 and the refractive index on $d$ line above 1.60, and the radius of curvature of the cemented surface $r_t$ is $0.3f < |r_t| < 3f$.

(4) The rearmost (the right) lenses $L_9$, $L_{10}$ are composed of two or more than two cemented lenses, and the radius of curvature $r_s$ of at least one of the cemented surfaces should be within the range of $0.1f < r_s < 5f$, and the refractive index $n_s$ of the medium on the left of the cemented surface should be larger than the refractive index $n'_s$ of the medium on the right side.

(5) Among the lenses composing the rearmost lenses (right), the Abbe's number of at least one of the positive lenses should be larger than 45, and Abbe's number of at least one negative lens should be less than 30.

The above given conditions (1), (2) and (5) enable the correction of the lateral chromatic aberration over half angle of view from 110° to 135° and make the curvature of image excellent. When these conditions are not satisfied, it is difficult these aberrations can be excellently corrected by the lenses of the rear group, and this state is shown by the Seidel aberration coefficient described hereinafter. However, the condition (2) has the effect to deteriorate the correction of the longitudinal chromatic aberration, and therefore the longitudinal chromatic aberration is corrected by the condition (3) overcoming the bad effects caused by the condition (2).

The correction of aberration is carried out by the above mentioned corrections while taking the balance of other aberrations, and the remaining aberrations can be corrected by the rear lenses. The correction of astigmatism and the balance of the lateral chromatic aberration has been made excellent by the condition (4).

When these conditions are not satisfied, it is difficult to correct the astigmatism of the peripheral angle of view.

The respective values of an embodiment of the achromatic super wide-angle lens of the invention are given under the condition of $f=10$, F/5.6, $2\omega=220°$.

| | | $nd_1=1.0$ | |
|---|---|---|---|
| $r_1=88.722$ | $d_1=4.5$ | $nd_2=1.61272$ | $vd=58.6$ |
| $r_2=30.356$ | $d_2=24.5$ | $nd_3=1.0$ | |
| $r_3=89.627$ | $d_3=3.9$ | $nd_4=1.62041$ | $vd=60.3$ |
| $r_4=14.301$ | $d_4=15.5$ | $nd_5=1.0$ | |
| $r_5=-66.282$ | $d_5=1.3$ | $nd_6=1.48848$ | $vd=70.3$ |
| $r_6=17.127$ | $d_6=5.8$ | $nd_7=1.78470$ | $vd=26.0$ |
| $r_7=59.586$ | $d_7=3.2$ | $nd_8=1.0$ | |
| $r_8=\infty$ | $d_8=1.9$ | $nd_9=1.51743$ | $vd=58.5$ |
| $r_9=\infty$ | $d_9=6.4$ | $nd_{10}=1.0$ | |
| $r_{10}=-3220.849$ | $d_{10}=5.6$ | $nd_{11}=1.78477$ | $vd=26.0$ |
| $r_{11}=14.816$ | $d_{11}=11.3$ | $nd_{12}=1.74372$ | $vd=45.0$ |
| $r_{12}=-56.365$ | $d_{12}=0.2$ | $nd_{13}=1.0$ | |
| $r_{13}=-305.981$ | $d_{13}=4.8$ | $nd_{14}=1.76764$ | $vd=46.5$ |
| $r_{14}=-28.988$ | $d_{14}=17.2$ | $bd_{15}=1.0$ | |
| $r_{15}=64.417$ | $d_{15}=2.6$ | $nd_{16}=1.78485$ | $vd=26.0$ |
| $r_{16}=22.224$ | $d_{16}=17.4$ | $nd_{17}=1.62230$ | $vd=53.1$ |
| $r_{17}=-69.508$ | | $nd_{18}=1.0$ | |

The aberration for $d$ line in the case of the above given embodiment is shown in FIG. 2 and it is remarkably corrected, and the corrections of the chromatic aberration and astigmatism are excellent. On the other hand, Seidel aberration coefficients when $f=1$, which is considered to be not so suitable for showing the properties of the super wide-angle lens of this invention, are given in the following table as a reference.

| j | I j | II j | III j-IV j | IV j | V j |
|---|---|---|---|---|---|
| 1 | 0.0003 | 0.0020 | 0.0227 | 0.0542 | 0.3143 |
| 2 | -0.0311 | 0.0165 | -0.0175 | -0.1339 | 0.0709 |
| 3 | 0.0111 | 0.0217 | 0.0850 | 0.0852 | 0.1671 |
| 4 | -1.7782 | 0.3818 | -0.1639 | -0.3497 | 0.0751 |
| 5 | 0.0413 | 0.0610 | 0.1803 | 0.0406 | 0.0601 |
| 6 | 4.1173 | -0.0747 | 0.0027 | 0.0665 | -0.0012 |
| 7 | -1.6867 | -0.4358 | -0.2252 | -0.1864 | -0.0481 |
| 8 | 0.4959 | 0.2376 | 0.2277 | 0.1139 | 0.0546 |
| 9 | -0.5124 | -0.2455 | -0.2353 | -0.1176 | -0.0564 |
| 10 | 0.6982 | 0.3392 | 0.3295 | 0.1634 | 0.0794 |
| 11 | -3.2596 | -0.3761 | -0.0878 | -0.0523 | -0.0060 |
| 12 | -0.0106 | 0.0054 | -0.0055 | 0.0730 | -0.0369 |
| 13 | 0.0135 | 0.0246 | 0.0897 | 0.0306 | 0.0559 |
| 14 | 0.0014 | 0.0227 | 0 | 0.1499 | 0.0002 |
| 15 | -0.0655 | 0.0741 | -0.1678 | -0.0156 | 0.0177 |
| 16 | -0.0207 | -0.0129 | -0.0161 | -0.0333 | -0.0208 |
| 17 | 1.9186 | 0.1320 | 0.0182 | 0.0643 | 0.0044 |
| Σ | 14.0656 | 0.1735 | 0.0379 | -0.0474 | 0.7301 |

Another embodiment is shown in FIG. 3, where the following modifications are made from the example described above:

(a) Front lens $L_1'$ is added to the first divergent meniscus group.

(b) $L_4$ is a cemented doublet composed of lens elements $L_4'$ and $L_4''$.

The respective values of the second embodiment of the achromatic super wide-angle of this invention under the condition of $f=10$, F/5.6, $2\omega=270°$ are given in the following table.

| | | $nd_1=1.0$ | |
|---|---|---|---|
| $r_1=204.583$ | $d_1=10.2$ | $nd_2=1.51680$ | $vd=64.2$ |
| $r_2=83.879$ | $d_2=43.0$ | $nd_3=1.0$ | |
| $r_3=112.709$ | $d_3=5.7$ | $nd_4=1.61272$ | $vd=58.6$ |
| $r_4=38.564$ | $d_4=31.1$ | $nd_5=1.0$ | |
| $r_5=113.858$ | $d_5=4.9$ | $nd_6=1.62041$ | $vd=60.3$ |
| $r_6=18.167$ | $d_6=19.6$ | $nd_7=1.0$ | |
| $r_7=-84.202$ | $d_7=1.6$ | $nd_8=1.48848$ | $vd=70.3$ |
| $r_8=21.757$ | $d_8=5.7$ | $nd_9=1.78470$ | $vd=26.0$ |
| $r_9=-409.165$ | $d_9=1.6$ | $nd_{10}=1.76764$ | $vd=46.5$ |
| $r_{10}=75.696$ | $d_{10}=4.1$ | $nd_{11}=1.0$ | |
| $r_{11}=\infty$ | | | |
| $r_{12}=\infty$ | $d_{11}=2.5$ | $nd_{12}=1.51743$ | $vd=58.5$ |
| $r_{13}=-4091.653$ | $d_{12}=8.2$ | $nd_{13}=1.0$ | |
| $r_{14}=18.822$ | $d_{13}=7.2$ | $nd_{14}=1.78477$ | $vd=26.0$ |
| $r_{15}=-71.604$ | $d_{14}=14.3$ | $nd_{15}=1.74443$ | $vd=49.4$ |
| $r_{16}=-388.707$ | $d_{15}=0.2$ | $nd_{16}=1.0$ | |
| $r_{17}=-36.825$ | $d_{16}=6.1$ | $nd_{17}=1.76764$ | $vd=46.5$ |
| $r_{18}=81.833$ | $d_{17}=21.9$ | $nd_{18}=1.0$ | |
| $r_{19}=27.209$ | $d_{18}=3.3$ | $nd_{19}=1.78485$ | $vd=26.0$ |
| $r_{20}=-83.108$ | $d_{19}=22.1$ | $nd_{20}=1.62041$ | $vd=60.3$ |
| | | $nd_{21}=1.0$ | |

The respective aberrations of the above given embodiment are shown in FIG. 4.

In the above tables, $r$ subscript is the radius of curvature of the surface of the lens element; $d$ subscript is the thickness of the lens element and air space between lens elements; $nd$ subscript is the refractive index on the $d$ line of the lens element; and $vd$ is the Abbe's number of the lens element.

What is claimed is:

1. An achromatic super wide-angle lens consisting of front divergent group consisting of two negative meniscus single lenses, the respective outer surfaces of which are curved towards the object and a negative cemented doublet composed of a double concave negative lens element and positive meniscus lens element; a rear convergent group consisting of a first convergent component composed of a positive cemented doublet formed by a double concave negative lens element and a double convex positive lens element and a positive meniscus single lens element spaced from said positive doublet, the rear surface of which is curved towards the image of the object and a second convergent component being a positive cemented doublet composed of negative meniscus lens element, both surfaces of which are curved towards the object and a double convex positive lens element; a filter and a stop between the negative doublet in front group and the positive doublet in the first component of said rear group whereby lateral chromatic aberration and curvature of image are corrected by said negative doublet in said front group and said positive doublet in said first component of said rear group, and longitudinal chromatic aberration is corrected by said positive doublet in said second component.

2. An achromatic super wide-angle lens according to claim 1 of which numerical data assuming $f=1.0$, F/5.6, $2\omega=220°$, is as follows:

| | | | |
|---|---|---|---|
| $r_1=88.722$ | | $nd_1=1.0$ | |
| | $d_1=4.5$ | $nd_2=1.61272$ | $vd=58.6$ |
| $r_2=30.356$ | | | |
| | $d_2=24.5$ | $nd_3=1.0$ | |
| $r_3=89.627$ | | | |
| | $d_3=3.9$ | $nd_4=1.62041$ | $vd=60.3$ |
| $r_4=14.301$ | | | |
| | $d_4=15.5$ | $nd_5=1.0$ | |
| $r_5=-66.282$ | | | |
| | $d_5=1.3$ | $nd_6=1.48848$ | $vd=70.3$ |
| $r_6=17.127$ | | | |
| | $d_6=5.8$ | $nd_7=1.78470$ | $vd=26.0$ |
| $r_7=59.586$ | | | |
| | $d_7=3.2$ | $nd_8=1.0$ | |
| $r_8=\infty$ | | | |
| | $d_8=1.9$ | $nd_9=1.51743$ | $vd=58.5$ |
| $r_9=\infty$ | | | |
| | $d_9=6.4$ | $nd_{10}=1.0$ | |
| $r_{10}=-3220.849$ | | | |
| | $d_{10}=5.6$ | $nd_{11}=1.78477$ | $vd=26.0$ |
| $r_{11}=14.816$ | | | |
| | $d_{11}=11.3$ | $nd_{12}=1.74372$ | $vd=45.0$ |
| $r_{12}=-56.365$ | | | |
| | $d_{12}=0.2$ | $nd_{13}=1.0$ | |
| $r_{13}=-305.981$ | | | |
| | $d_{13}=4.8$ | $nd_{14}=1.76764$ | $vd=46.5$ |
| $r_{14}=-28.988$ | | | |
| | $d_{14}=17.2$ | $nd_{15}=1.0$ | |
| $r_{15}=64.417$ | | | |
| | $d_{15}=2.6$ | $nd_{16}=1.78485$ | $vd=26.0$ |
| $r_{16}=22.224$ | | | |
| | $d_{16}=17.4$ | $nd_{17}=1.62230$ | $vd=53.1$ |
| $r_{17}=-69.508$ | | | |
| | | $nd_{18}=1.0$ | |

Where $r$ subscript is the radius of curvature of the surface of the lens element; $d$ subscript is the thickness of the lens element and air space between lens elements; $nd$ subscript is the refractive index on the $d$ line of the lens element; and $vd$ is the Abbe's number of the lens element.

3. An achromatic super wide angle lens consisting of a front divergent group consisting of three negative meniscus single lenses, the outer surface of which are curved towards the object and a negative cemented triplet composed of a double concave negative lens element, a double convex positive lens element and a double concave negative lens element; a rear convergent group consisting of a first convergent component consisting of a positive cemented doublet composed of double concave negative lens element and a double convex positive lens element, a meniscus single lens element spaced from said positive doublet the surfaces of which curve towards the image of the object, and a second convergent component of a positive cemented doublet composed of negative meniscus lens element, the surfaces of which are curved towards the object, and double convex positive lens element; a filter and a stop between said triplet and said positive doublet in said first component of said rear group, whereby lateral chromatic aberration and curvature of image are corrected by said triplet and said positive doublet in said first component of said rear group and longitudinal chromatic aberration is corrected by said positive doublet in said second component.

4. An achromatic super wide-angle lens according to claim 3, of which numerical data, assuming $f=1,0$, F/5.6, $2\omega=270°$ is as follows:

| | | | |
|---|---|---|---|
| | | $nd_1=1.0$ | |
| $r_1=204.583$ | | | |
| | $d_1=10.2$ | $nd_2=1.51680$ | $vd=64.2$ |
| $r_2=83.879$ | | | |
| | $d_2=43.0$ | $nd_3=1.0$ | |
| $r_3=112.709$ | | | |
| | $d_3=5.7$ | $nd_4=1.61272$ | $vd=58.6$ |
| $r_4=38.564$ | | | |
| | $d_4=31.1$ | $nd_5=1.0$ | |
| $r_5=113.858$ | | | |
| | $d_5=4.9$ | $nd_6=1.62041$ | $vd=60.3$ |
| $r_6=18.167$ | | | |
| | $d_6=19.6$ | $nd_7=1.0$ | |
| $r_7=-84.202$ | | | |
| | $d_7=1.6$ | $nd_8=1.48848$ | $vd=70.3$ |
| $r_8=21.757$ | | | |
| | $d_8=5.7$ | $nd_9=1.78470$ | $vd=26.0$ |
| $r_9=-409.165$ | | | |
| | $d_9=1.6$ | $nd_{10}=1.76764$ | $vd=46.5$ |
| $r_{10}=75.696$ | | | |
| | $d_{10}=4.1$ | $nd_{11}=1.0$ | |
| $r_{11}=\infty$ | | | |
| | $d_{11}=2.5$ | $nd_{12}=1.51743$ | $vd=58.5$ |
| $r_{12}=\infty$ | | | |
| | $d_{12}=8.2$ | $nd_{13}=1.0$ | |
| $r_{13}=-4091.653$ | | | |
| | $d_{13}=7.2$ | $nd_{14}=1.78477$ | $vd=26.0$ |
| $r_{14}=18.822$ | | | |
| | $d_{14}=14.3$ | $nd_{15}=1.74443$ | $vd=49.4$ |
| $r_{15}=-71.604$ | | | |
| | $d_{15}=0.2$ | $nd_{16}=1.0$ | |
| $r_{16}=-388.707$ | | | |
| | $d_{16}=6.1$ | $nd_{17}=1.76764$ | $vd=46.5$ |
| $r_{17}=-36.825$ | | | |
| | $d_{17}=21.9$ | $nd_{18}=1.0$ | |
| $r_{18}=81.833$ | | | |
| | $d_{18}=3.3$ | $nd_{19}=1.78485$ | $vd=26.0$ |
| $r_{19}=27.209$ | | | |
| | $d_{19}=22.1$ | $nd_{20}=1.62041$ | $vd=60.3$ |
| $r_{20}=-83.108$ | | | |
| | | $nd_{21}=1.0$ | |

Where $r$ subscript is the radius of curvature of the surface of the lens element; $d$ subscript is the thickness of the lens element and air space between lens elements; $nd$ subscript is the refractive index on the $d$ line of the lens element; and $vd$ is the Abbe's number of the lens element.

References Cited

UNITED STATES PATENTS 2,629,285  2/1953  Baker _____ 350—196
2,721,499  10/1955  Bertele _____ 350—177 X
2,730,016  1/1956  Bertele _____ 350—177 X

FOREIGN PATENTS 1,046,361  12/1958  Germany.

DAVID SCHONBERG, Primary Examiner

P. A. SACHER, Assistant Examiner

U.S. Cl. X.R.

350—177, 216